United States Patent [19]

Parker et al.

[11] Patent Number: 5,164,135
[45] Date of Patent: Nov. 17, 1992

[54] IN-MOLD MATING OF SUBSTRATE MATERIAL TO VINYL SKIN COVERING FOR THE CONSTRUCTION OF TWO-COMPONENT AUTOMOTIVE INTERIOR TRIM PARTS

[75] Inventors: Kent L. Parker, Strafford; James C. Carter, Dover, both of N.H.

[73] Assignee: Davidson Textron Inc., Dover, N.H.

[21] Appl. No.: 589,779

[22] Filed: Sep. 26, 1990

[51] Int. Cl.⁵ .............................................. B29D 9/00
[52] U.S. Cl. ................................... 264/161; 264/257; 264/271.1
[58] Field of Search .............. 264/248, 249, 257, 273, 264/258, 255, 259, 271.1, 161, 138

[56] References Cited

U.S. PATENT DOCUMENTS

| | | | |
|---|---|---|---|
| 2,797,179 | 6/1957 | Reynolds et al. | 264/257 |
| 4,123,488 | 10/1978 | Lawson | 264/255 |
| 4,228,113 | 10/1980 | Van Gasse | 264/255 |
| 4,315,884 | 2/1982 | Van Gasse | 264/255 |
| 4,316,869 | 2/1982 | Van Gasse | 264/255 |
| 4,356,230 | 10/1982 | Emanuel et al. | 264/255 |
| 4,418,031 | 11/1983 | Doerer et al. | 264/257 |
| 4,466,848 | 8/1984 | Ogawa | 264/257 |
| 4,478,660 | 10/1984 | Landler et al. | 264/46.4 |
| 4,659,412 | 4/1987 | Newman et al. | 427/316 |
| 4,734,147 | 3/1988 | Moore | 264/257 |
| 4,749,613 | 6/1988 | Yamada et al. | 293/155 |
| 4,775,580 | 10/1988 | Dighton | 264/49 |
| 4,784,911 | 11/1988 | Gembinski et al. | 427/180 |
| 5,087,405 | 2/1992 | Maker | 264/257 |

FOREIGN PATENT DOCUMENTS

| | | | |
|---|---|---|---|
| 0363130 | 4/1990 | European Pat. Off. | 264/257 |
| 56-105954 | 8/1981 | Japan | 264/257 |
| 2040801A | 9/1980 | United Kingdom . | |

Primary Examiner—Jay H. Woo
Assistant Examiner—Robert B. Davis
Attorney, Agent, or Firm—Reising, Ethington, Barnard, Perry & Milton

[57] ABSTRACT

A method of molding automotive interior trim parts wherein a block of a predetermined thickness and area of a suitable grade of fiber or other suitable insert material is pressed into a molten vinyl shell during the latter's curing cycle. The fiber block or insert becomes fused to the vinyl shell and may expand to approximately three times its original thickness to serve as the backing and mounting insert for the finished two-component interior trim part.

5 Claims, 1 Drawing Sheet

IN-MOLD MATING OF SUBSTRATE MATERIAL TO VINYL SKIN COVERING FOR THE CONSTRUCTION OF TWO-COMPONENT AUTOMOTIVE INTERIOR TRIM PARTS

TECHNICAL FIELD

This invention relates generally to the apparatus and method of molding automotive interior trim parts of vinyl-coated fibrous materials, such as automotive instrument panels and, more particularly, to the molding of such parts consisting of two components.

BACKGROUND ART

Heretofore, in the injection molding of the above referenced interior trim parts, three component parts were generally involved in the formation of the finished product.

Typically, a preformed grained vinyl shell has been made from dry thermoplastic powder particles which are applied to a heated shell mold from a powder box to form a continuous monochromatic one-piece shell. See U.S. Pat. No. 4,784,911.

The resultant vinyl shell is then fitted into a pour mold, covering the entire inner exposed surface of the mold. Thereafter, a suitable liquid expandable foam material, including a suitable adhesion material, is poured onto the surface of the vinyl shell either prior to covering the pour mold with a cover, or through a pour opening formed in the closed cover.

A mounting insert or substrate backing material is detachably mounted on the inner surface of the cover, such that is becomes bonded to the foam material once the latter has expanded to fill the entire cavity intermediate the vinyl shell and the cover, thus forming the finished product.

DISCLOSURE OF THE INVENTION

A general object of the invention is to provide a less costly method of molding automotive interior trim parts with less required equipment than has heretofore been the case, but which is satisfactory and efficient.

Another object of the invention is to provide an improved method for forming the finished automotive interior trim products as two-component parts, rather than three-component parts.

A further object of the invention is to provide a method of molding automotive interior trim parts wherein a suitable insert or substrate material is pressed into the back side of the vinyl shell while the latter is still molten during its curing operation, eliminating the need for a pouring operation introducing an intermediate expanding foam material.

Still another object of the invention is to provide such a two-component method, wherein the insert or substrate material is such that it expands and/or becomes soft due to the heat involved in the curing operation for the accompanying molten vinyl shell.

A still further object of the invention is to provide such a two-component method, wherein the expanded insert or substrate material of the completed part is attached to the vehicle framework by adhesives or adhesively bonded fasteners.

These and other objects and advantages will become more apparent when reference is made to the following drawings and the accompanying description.

BEST MODE FOR CARRYING OUT THE INVENTION

Figure 1:
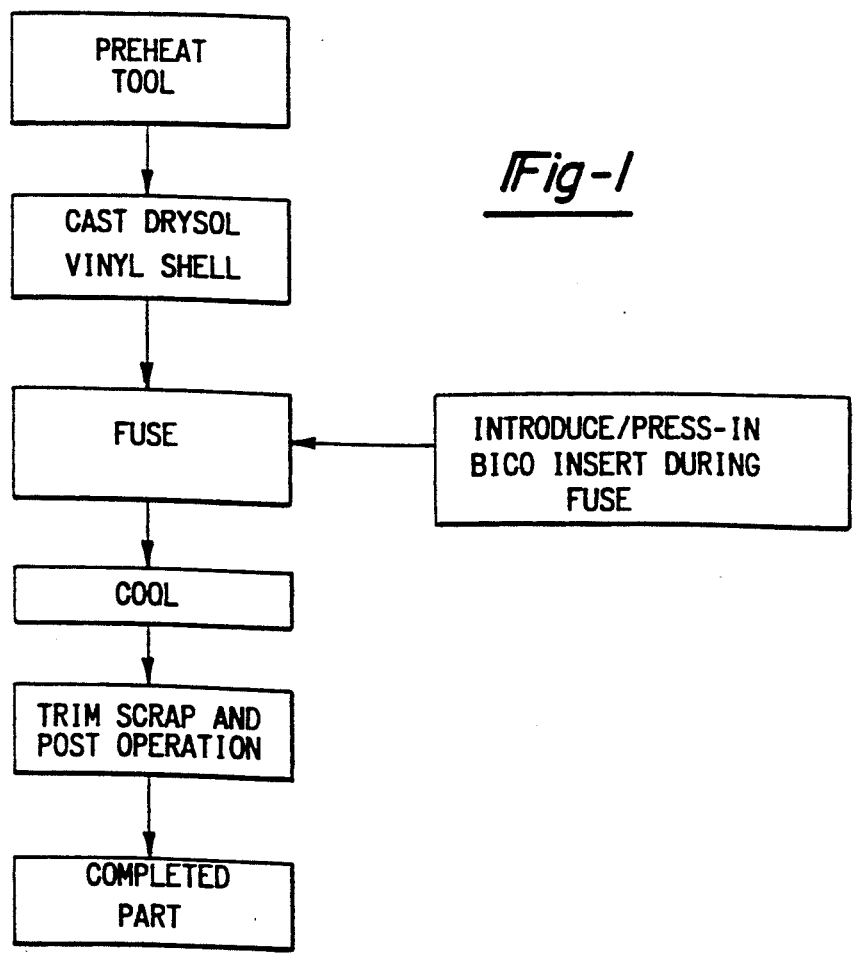
FIG. 1 is a block diagram representing the steps involved in the inventive method.
Figure 2:
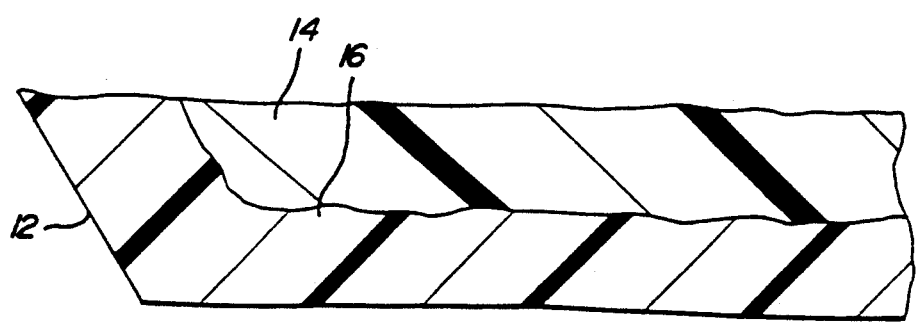
FIG. 2 is a fragmentary cross-sectional view illustrating the result of the steps of the FIG. 1.

Referring now to the drawings in greater detail, FIG. 1 represents the process steps of heating a shell tool to a predetermined vinyl cast temperature; introducing a powdered or small particle 12 such as polyvinylchloride (PVC) into the tool so that it becomes cast as a vinyl shell therein; placing the vinyl shell and tool into a fuse oven for curing the vinyl; after a predetermined length of time into the curing cycle, say, 30 to 50 seconds, pressing a suitable polyester or polypropylene staple fiber insert or substrate material 14 into the back side 16 of the vinyl shell while it is still molten, allowing the two parts to become fused together at their mating surfaces; and removing the vinyl shell and insert combination from the fuse oven and allowing same to cool. Thereafter, the combination is trimmed as required to produce the finished product. The finished product may be attached to the vehicle framework by adhesives or adhesively bonded fasteners.

The preferred time for heating the shell tool to a temperature of 380° F. is 1 to 4 minutes. The preferred temperature for the fuse oven is 512° F. A typical curing cycle time is 50 or more seconds, depending upon the size of the mold.

A preferred polyester/polypropylene staple fiber material is available under the tradename "BICO" from BASF Fibers Division, P.O. Drawer D, Williamsburg, Va. 23187.

It is important that the particular grade of BICO material selected not only have good adhesion qualities with respect to the vinyl shell material, but also that it be adaptable to expanding and/or becoming soft when heated, to assure a resiliency in the finished product which would deform or compress to some extent upon impact.

Once the length and width of the BICO material is selected for adaptability to the surface to which it is to be attached, an original thickness, such as ⅛ inch is selected, with the knowledge that it will expand to approximately ⅜ inch during the curing cycle.

INDUSTRIAL APPLICABILITY

It should be apparent that the invention provides a cost efficient method and satisfactory resultant two-component automotive interior trim product.

It should also be apparent that particular shapes of blocks of BICO material or other suitable insert material may be selected for the formation of various interior trim parts, such as instrument panels, arm rests, and glove doors.

The embodiments of the invention in which an exclusive property or privilege is claimed are defined as follows:

1. A method of molding automotive interior trim products, said method comprising the steps of:
   a. Heating a shell tool to a temperature of approximately 380°;
   b. Introducing a suitable polyvinylchloride shell-forming material into the heated tool to form a polyvinylchloride shell therein;

c. Heating a fuse oven to a temperature of approximately 512° F.;
d. Placing the tool and polyvinylchloride shell into the heated fuse oven for curing the polyvinylchloride shell;
e. Selecting a thickness of a staple fiber block and preparing it into a predetermined length and width to serve as a backing insert;
f. After a time of up to approximately 50 seconds into the curing cycle, mechanically pressing the backing insert to a predetermined depth into a side of the polyvinylchloride shell while the shell is still molten to form a mechanical bond therewith;
g. Allowing the backing insert and polyvinylchloride shell to become fused together during the remaining portion of the curing cycle while the backing insert expands to a plurality of multiples of its original thickness;
h. Removing the polyvinylchloride shell and backing insert fused combination and allowing it to cool; and
i. Trimming the combination as required to produce the finished product.

2. The method described in claim 1, wherein the preferred original thickness of the staple fiber block is approximately ⅛ inch.

3. The method described in claim 2, wherein the stable fiber block is a grade of one of polyester or polypropylene.

4. The method described in claim 3, wherein the staple fiber block expands during the remaining portion of the during cycle from the original ⅛ inch thickness to approximately a ⅜" finished thickness fused to the vinyl shell.

5. A method of molding automotive interior trim products, said method comprising the steps of:
a. Heating a shell tool to a temperature of approximately 380° F.;
b. Introducing a powdered material into the heated tool to form a shell therein;
c. Heating a fuse oven to a temperature of approximately 512° F.;
d. Placing the tool and shell into the heated fuse oven for curing the shell;
e. Selecting a block of one of polyester or polypropylene approximately ⅛ inch thick and preparing it into a predetermined length and width to serve as a backing insert;
f. After approximately 30 to 50 seconds into the curing cycle, mechanically pressing the backing insert to a predetermined depth into a side of the shell while the shell is still molten to form a mechanical bond therewith;
g. Allowing the backing insert and shell to become fused together during the remaining portion of the curing cycle while the ⅛ inch thick block expands to approximately ⅜ inch;
h. Removing the shell and backing insert fused combination and allowing it to cool; and
i. Trimming the combination as required to produce the finished product.

* * * * *